United States Patent [19]

Kitajima et al.

[11] Patent Number: 4,531,831
[45] Date of Patent: Jul. 30, 1985

[54] VARIABLE MAGNIFICATION IMAGE FORMATION APPARATUS

[75] Inventors: Tadayuki Kitajima; Akiyoshi Kimura, both of Yokohama, Japan

[73] Assignee: Canon Kabushiki Kaisha, Tokyo, Japan

[21] Appl. No.: 628,023

[22] Filed: Jul. 5, 1984

Related U.S. Application Data

[63] Continuation of Ser. No. 437,013, Oct. 27, 1982, abandoned.

[30] Foreign Application Priority Data

Nov. 11, 1981 [JP] Japan ................................ 56-181558
Nov. 11, 1981 [JP] Japan ............................ 56-168471[U]

[51] Int. Cl.³ ............................................. G03B 27/34
[52] U.S. Cl. ........................................ 355/57; 350/429
[58] Field of Search .................... 355/50, 56, 57, 55, 355/58; 352/139, 140

[56] References Cited

U.S. PATENT DOCUMENTS

| 3,582,203 | 6/1971 | Cox | 355/56 X |
| 3,597,065 | 8/1971 | Radulet | 352/140 |
| 4,046,467 | 9/1977 | Laskowski et al. | 355/57 X |
| 4,120,578 | 10/1978 | Danials et al. | 355/57 X |
| 4,322,159 | 9/1980 | Takahashi et al. | 355/57 |
| 4,420,248 | 12/1983 | Ogawa et al. | 355/57 |

FOREIGN PATENT DOCUMENTS

2016732 9/1979 United Kingdom ................. 355/56

Primary Examiner—John Gonzales
Assistant Examiner—Brian W. Brown
Attorney, Agent, or Firm—Fitzpatrick, Cella, Harper & Scinto

[57] ABSTRACT

Disclosed is a variable magnification image formation apparatus wherein an image of an original is formed on a photosensitive member by the use of a zoom lens assembly of the type in which the focal length is changed by rotating a zoom ring about the optical axis and wherein the zoom ring is rotated by wire in synchronism with movement of the zoom lens assembly.

26 Claims, 6 Drawing Figures

VARIABLE MAGNIFICATION IMAGE FORMATION APPARATUS

This is a continuation of application Ser. No. 437,013, filed Oct. 27, 1982, now abandoned.

BACKGROUND OF THE INVENTION

1. Field of the Invention

This invention relates to a variable magnification image formation apparatus which uses a zoom lens assembly to form an image of an original on a photosensitive member.

2. Description of the Prior Art

A variable magnification image formation apparatus using a lens of variable focal length, namely, a so-called zoom lens assembly, has various advantages over a variable magnification image formation apparatus using a so-called fixed focus lens assembly. For example, in apparatus using a fixed focus lens assembly for changing magnification, it is necessary to move not only the lens but also a mirror, since it is necessary to vary the ratio of the lengths of the optical path before and behind the lens as well as the length of the entire optical path between the original and the surface of the photosensitive member in the apparatus using a zoom lens assembly, for changing magnification, it is not necessary to vary the length of the entire optical path so that it is not necessary to move the lens. Therefore, in apparatus using a zoom lens assembly, the construction of the magnification changing mechanism is relatively simple and the apparatus is compact. Also, the number of movable elements can be reduced and this leads to the possibility of forming images of good quality.

In the above-described image formation apparatus using a zoom lens assembly, during magnification change, the zoom lens assembly must be moved while, at the same time, the focal length of the zoom lens must be varied. Apparatus in which the focal length of the zoom lens is varied are disclosed in U.S. Pat. Nos. 3,967,896; 4,046,467; and 3,765,760 and Japanese Laid-open Patent Application No. 133756/1981. These literatures only disclose apparatus in which one lens barrel portion is moved back and forth relative to the other lens barrel portion by a cam of a lever provided adjacent to the lens barrel, and do not suggest a focal length changing device of a zoom lens assembly of the type in which the focal length is changed by a member rotated about the optical axis of the lens, such as a so-called zoom ring.

SUMMARY OF THE INVENTION

It is an object of the present invention to provide a variable magnification image formation apparatus using a zoom lens assembly of the type in which the focal length is changed by a member rotated about the optical axis of the lens.

It is another object of the present invention to provide a variable magnification image formation apparatus which is simple in construction of the magnification changing mechanism.

It is still another object of the present invention to provide a variable magnification image formation apparatus which uses a zoom lens assembly of the type in which the focal length is changed by a member rotated about the optical axis of the lens, thereby simplifying the construction of the magnification changing mechanism.

It is yet still another object of the present invention to provide a variable magnification image formation apparatus provided with a magnification changing mechanism of high operational accuracy.

Other objects and features of the present invention will become apparent from the following detailed description taken in conjunction with the accompanying drawings.

DESCRIPTION OF THE PREFERRED EMBODIMENTS

Figure 1:
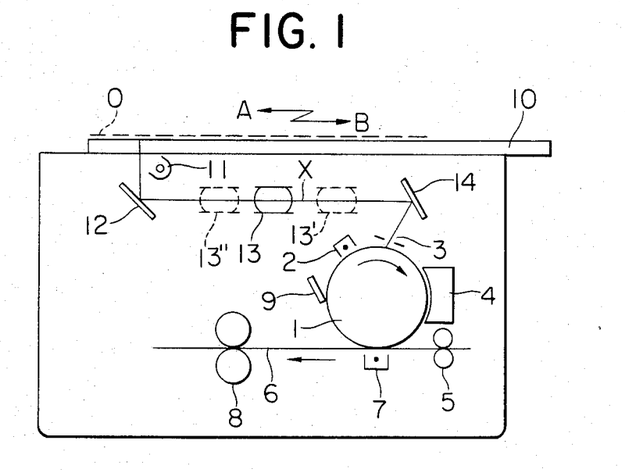
FIG. 1 illustrates an example of the electrophotographic copying apparatus to which the present invention is applicable.

Referring to FIG. 1, a drum-like electrophotographic photosensitive member 1 is rotated in clockwise direction and is first uniformly charged by a charger 2, and then is exposed to an optical image of an original 0 at a selected magnification, whereby an electrostatic latent image of the original at the selected magnification is formed on the photosensitive member 1. This latent image is developed by toner with the aid of developing means 4, and the resultant toner image is transferred to transfer paper 6 conveyed by conveyor rollers 5, under the action of the transfer charger 7. The toner image transferred to the paper 6 is fixed by a fixing device 8 while, on the other hand, the photosensitive member 1 after the image transfer is cleaned by a cleaning device 9, thus becoming ready for another cycle of image formation.

The original 0 is placed on a reciprocally movable original carriage 10 which is moved in the direction of arrow A for the original scanning and when this original scanning is terminated, is moved backward in the direction of arrow B to return to a forward movement starting position. The velocity of forward movement of the carriage 10 in the direction of arrow A, or in other words, the scanning velocity of the original 0, is the peripheral velocity of the photosensitive member 1 multiplied by the inverse number of the selected magnification. Thereby the magnification of the latent image with respect to the direction of movement of the photosensitive member is brought into accord with the selected magnification.

When the carriage 10 is being moved in the direction of arrow A, the original 0 thereon is illuminated by a lamp 11 and the photosensitive member 1 is slit-exposed to the optical image of the original 0 at the selected magnification through a mirror 12, a zoom lens assembly 13 and a mirror 14, as previously described. The mirrors 12 and 14 are always fixed at their shown positions, whereby the length of the optical path between the original and the photosensitive member (the length of the entire optical path) is kept constant for any copying magnification. On the other hand, the focal length of the zoom lens assembly 13 and the position thereof on the optical path are changed by a copying magnification changing operation. The position and focal length of the zoom lens assembly 13 in case the selected magnification is m are shown here. Let L be the length of the entire optical path, $l_1$ be the length of the optical path between the original and the zoom lens assembly, $l_2$ be the length of the optical path between the zoom lens assembly and the photosensitive member and f be the focal length of the zoom lens assembly. $l_1$, $l_2$ and f are changed correspondingly to the selected magnification. Thus, $l_1$, $l_2$ and f are given by the following equations:

$$l_1 = \frac{1}{1 + m} L \quad (1)$$

$$l_2 = \frac{m}{1 + m} L \quad (2)$$

$$f = \frac{m}{(1 + m)^2} L \quad (3)$$

In any case, in the apparatus of FIG. 1, the zoom lens assembly 13 lies at the shown solid-line position in $m_1$ ($m_1 = 1$) magnification copying mode, lies at the shown broken-line position 13' in $m_2$ ($m_2 < 1$) magnification copying mode, and lies at the shown broken-line position 13" in $m_3$ ($m_3 > 1$) magnification copying mode, and at the respective positions, it has focal lengths corresponding to the selected magnifications and forms the images of the original at the selected magnifications on the photosensitive member.

Figure 2:
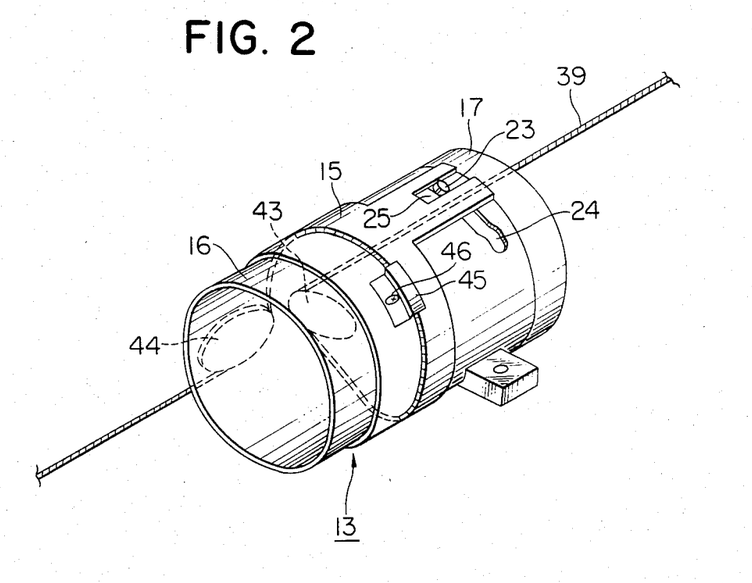
FIG. 2 is a perspective view of a zoom lens assembly in an embodiment of the present invention.
Figure 3:
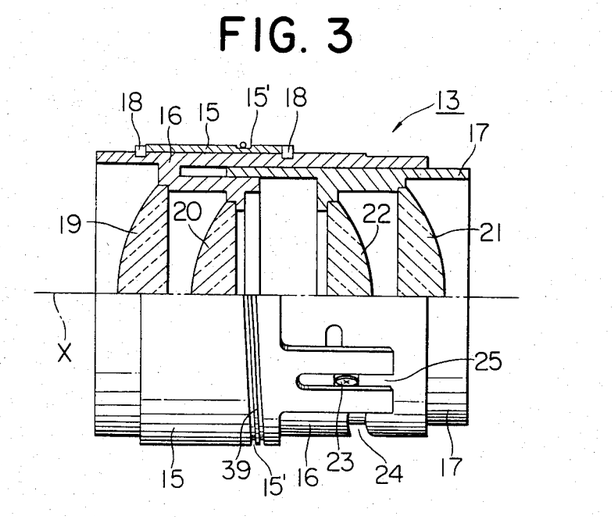
FIG. 3 illustrates the zoom lens assembly.

FIG. 2 is a perspective view of the zoom lens assembly 13 used in the apparatus of FIG. 1, and FIG. 3 is a side view (partly in cross section) thereof. In these figures, reference numeral 15 designates an outer lens barrel (zoom ring), reference numeral 16 denotes an intermediate lens barrel, and reference numeral 17 designates an inner lens barrel. The outer lens barrel 15 is fitted over the intermediate lens barrel 16 for rotation relative to the intermediate lens barrel 16 about the optical axis X of the lens. Pins 18 are studded on the intermediate lens barrel 16 and engaged with the opposite ends of the outer lens barrel 15 to render the outer lens barrel 15 rotatable about the optical axis X of the lens and around the intermediate lens barrel 16 as described above, but immovable relative to the intermediate lens barrel 16 in the direction of the optical axis X of the lens. The inner lens barrel 17 is fitted in the intermediate lens barrel 16 for rotation relative to the intermediate lens barrel about the optical axis X and for movement relative to the intermediate lens barrel in the direction of the optical axis X. Lens elements 19 and 20 are fixed to the intermediate lens barrel 16, and lens elements 21 and 22 are fixed to the inner lens barrel 17. The focal length of the lens system may be changed by changing the spacing between the set of lens elements 19, 20 and the set of lens elements 21, 22. To change the spacing between the set of lens elements 19, 20 and the set of the lens elements 21, 22, the inner lens barrel 17 to which the latter is fixed may be moved in the direction of the optical axis X relative to the intermediate lens barrel 16 to which the former is fixed.

A mechanism for effecting such relative movement will now be described in detail. Designated by 23 is a cam follower studded on the inner lens barrel. This follower 23 is engaged with a slot cam 24 provided in the intermediate lens barrel 16 and having a direction component in a direction inclined to the direction of the optical axis X of the lens. The cam follower 23 is also engaged with a slot 25 formed in the outer lens barrel 15 and elongated in the direction of the optical axis X of the lens. Accordingly, if the outer lens barrel 15 is rotated relative to the intermediate lens barrel 16 about the optical axis X, the follower 23 will be pushed by the slot 25 and rotated relative to the intermediate lens barrel 16 about the optical axis X and at that time, by the guidance of the slot cam 24, the follower 23 will also be moved relative to the intermediate lens barrel 16 in the direction of the optical axis X of the lens. In other words, the inner lens barrel 17 will be moved relative to the intermediate lens barrel 16 in the direction of the optical axis X of the lens while being rotated about the optical axis X, whereby the spacing between the set of lens elements 19, 20 and the set of lens elements 21, 22 will be changed. (The lens elements 19 to 20 are schematically illustrative of some of a number of lens elements forming the zoom lens system to simplify the illustration, and FIG. 3 intends chiefly to show an example of the mechanism for changing the spacing between a plurality of lens elements for changing the focal length. The zoom lens system comprising a plurality of lens elements may be a well-known one)

Figure 4:
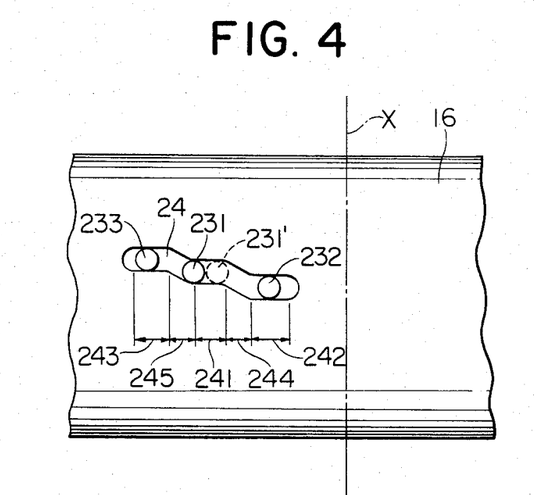
FIG. 4 illustrates the slot cam of the zoom lens assembly.

FIG. 4 shows the intermediate lens barrel 16 as developed on a plane and the slot cam 24 as developed on a plane. The cam follower 23 is engaged with the slot cam 24 as indicated at 231 in area 241 in the $m_1$ magnification copying mode, as indicated at 232 in area 242 in the $m_2$ magnification copying mode, and as indicated at 233 in area 243 in the $m_3$ magnification copying mode, and the spacing between said lens elements is set so as to establish the focal lengths corresponding to the selected magnifications. As shown, in the areas 241, 242 and 243, the slot cam 24 faces in a direction perpendicular to the optical axis X of the lens and, in an area 244 connecting the areas 241 and 242 and in an area 245 connecting the areas 241 and 243, the slot cam 24 faces in a direction inclined at an other angle than 90° relative to the optical axis X of the lens, as shown. In other words, the areas 241, 242 and 243 of the slot cam are areas perpendicular to the generating line of the intermediate lens barrel, while the areas 244 and 245 are areas inclined relative to the generating line of the intermediate lens barrel. Accordingly, during the time the follower passes through the areas 244 and 245, the inner lens barrel 17 moves relative to the intermediate lens barrel 16 in the direction of the optical axis X, whereby the spacing between said lens elements is varied and the focal length of the lens system is varied. On the other hand, even if the outer lens barrel 15 is rotated relative to the intermediate lens barrel 16 within a range in which the follower 23 is engaged with the areas 241, 242 and 243, the inner lens barrel 17 does not move relaive to the intermediate lens barrel 16 in the direction X and therefore, at this time, the spacing between said lens elements is not varied and accordingly, the focal length of the lens system is varied neither. Therefore, even if there is an error in the amount of rotation of the outer lens barrel 15 during the magnification changing operation, or in other words, the amount of rotation of the follower 23, depending on the apparatus, a focal length corresponding to a selected magnification can be obtained accurately. For example, even if, with respect to the $m_1$ magnification copying mode, the follower 23 is engaged with the slot cam 24 at the position 231 in one apparatus and is engaged with the slot cam 24 at the position 231' in another apparatus, both positions are in the area 241 and therefore, in both cases, the focal length of the lens system is kept the same.

Figure 5:
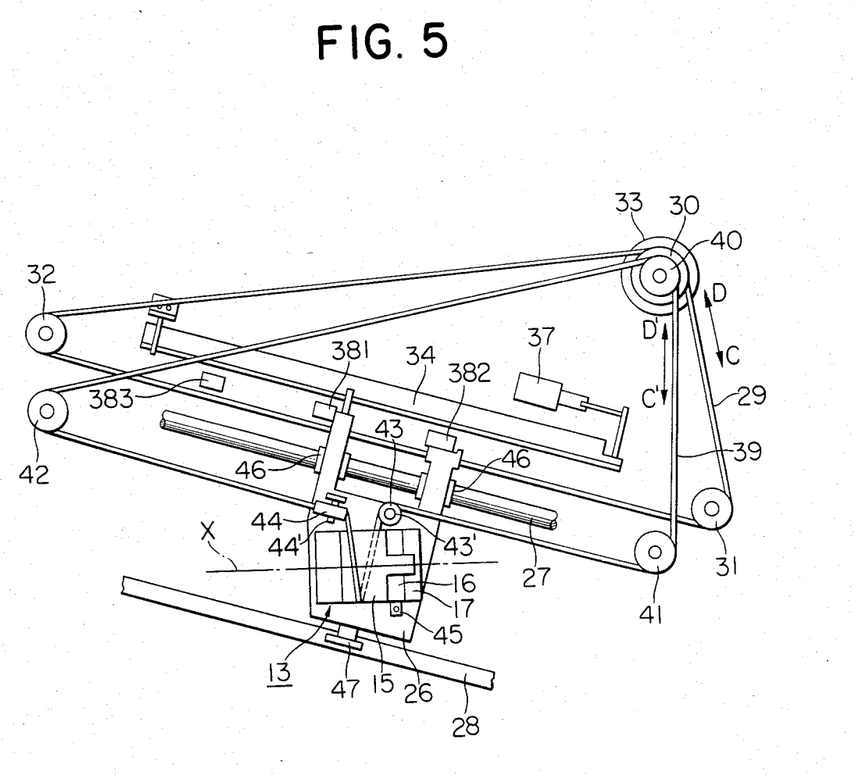
FIG. 5 illustrates the essential portions of an embodiment of the present invention.

Now, referring to FIG. 5, the zoom lens assembly 13 is attached to a carriage 26 by the intermediate lens barrel 16 thereof being fixed to the carriage 26 by fixing means 45 such as screws. The carriage 26 is supported for movement lengthwisely of rails 27 and 28 by a sliding bearing 46 fixed thereto being fitted on the rail 27 and a roller rotatably supported thereon being placed on the rail 28. The rails 27 and 28 are inclined with respect to the optical axis X, and this is for the purpose of moving the entire lens assembly in a direction inclined with respect to the optical axis X (namely, a direction comprising a composite of the direction of the optical axis X and the direction perpendicular to the optical axis X) by a magnification changing operation in order that at any magnification, the image of the side edge portion of the original on the side edge portion of the original carriage may be photographed on the side edge portion of the photosensitive member.

Wire 29 is secured to the carriage 26 in order to move the lens assembly 13 as a whole along the rails 27 and 28 to bring it to a position corresponding to a selected magnification. This wire 29 is passed over pulleys 30, 31 and 32 rotatably disposed at predetermined positions. The pulley 30 is connected to the drive shaft of a reversible motor 33 so that when the motor 33 is rotated in forward direction, the wire 29 is moved round in the direction of arrow C to move the lens assembly 13 leftwardly as viewed in FIG. 1 and that when the motor 33 is rotated in reverse direction, the wire 29 is moved round in the direction of arrow D to move the lens assembly 13 rightwardly as viewed in FIG. 1. That is, the rotative drive force of the pulley 30 is transmitted to the carriage 26 by the wire 29, whereby the lens assembly 13 as a whole is moved.

Figure 6:
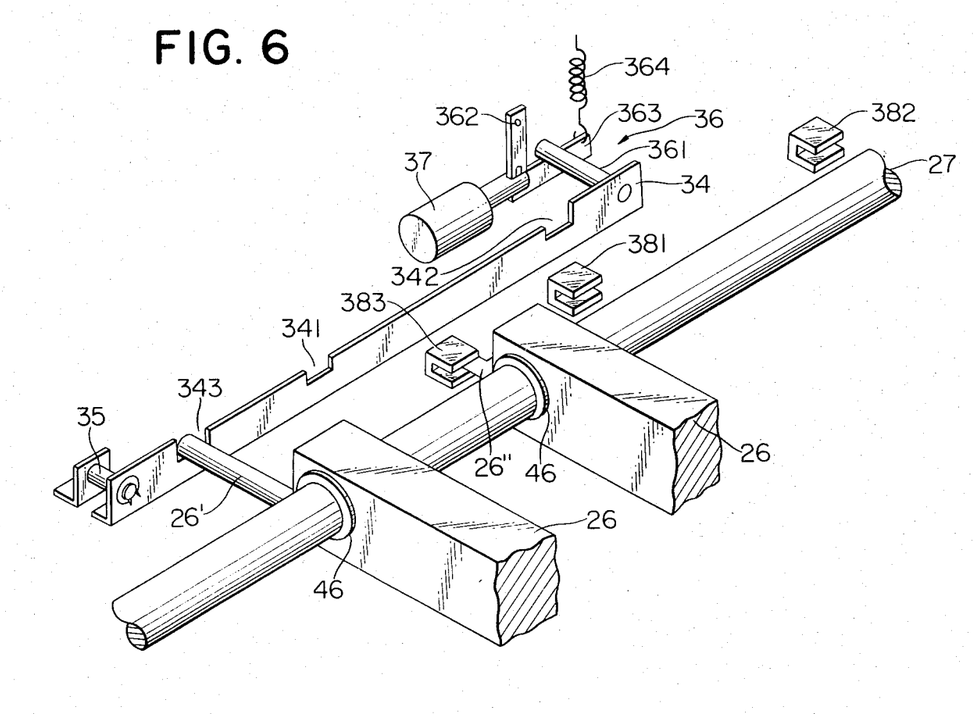
FIG. 6 illustrates an example of the zoom lens assembly positioning mechanism.

Reference is now had to FIG. 6 to describe an example of the mechanism for positioning the lens assembly 13 at a position on the optical path which corresponds to a selected magnification. In FIG. 6, reference numeral 34 designates a lens positioning plate having lens positioning grooves 341, 342 and 343 in which a bar 26' projectedly provided on the lens carriage 26 may fit. The lens positioning plate 34 is pivotably supported on a shaft 35 and connected to an electromagnetic plunger 37 through a connecting mechanism 36. That is, a bar 361 is fixed to the plate 34 and rests on a lever 363 pivotably supported by a shaft 362 and biased counterclockwise by a spring 364. The lever 363 is pivotable clockwise against the force of the spring 346 when the plunger 37 is energized. When the plunger 37 is energized, the plate 34 pivots about a shaft 35 and lowers from gravity to a position to release the engagement between the bar 26' fixed to the carriage 26 and the grooves 341, 342, 343. Thus, said movement of the carriage 26 becomes possible. Conversely, when the plunger 37 is deenergized, the plate 34 pivots upwardly about the shaft 35 due to the biasing force of the spring 364 and the bar 26' comes into engagement with one of the three grooves which corresponds to the selected magnification, whereby the lens assembly 13 is stopped and held at a position corresponding to the selected magnification.

The bar 26' fits in the groove 341 in the $m_1$ magnification copying mode, in the groove 342 in the $m_2$ magnification copying mode, and in the groove 343 in the $m_3$ magnification copying mode. Designated by 381, 382 and 383 are position detecting elements for detecting that the lens assembly 13 has come to the $m_1$ magnification copying mode position, the $m_2$ magnification copying mode position and the $m_3$ magnification copying mode position. These position detecting elements 381, 382 and 383 are disposed along the movement path of the carriage 26. The elements 381, 382, 383 each are a photocoupler comprising a light-emitting element and a light-receiving element disposed in opposed relationship with each other, and when a plate 26'' fixed to the carriage 26 has come to a position between the light-emitting element and the light-receiving element, the plate 26'' intercepts the light emitted from the light-emitting element relative to the light-receiving element, whereby the light-receiving element forms a signal.

Thus, when the operator designates a desired magnification by means of a selector button (not shown) and depresses a copy button (not shown), power is supplied to the plunger 37 and the lens positioning plate 34 is lowered to render the carriage 26 free. The reversible motor 33 is then rotated and the carriage 26 is moved along the guide rails 27 and 28. The position of the carriage 26 is detected by said position detecting element. When the carriage comes to a position corresponding to the desired magnification, the position detecting element corresponding to that magnification forms a signal and the power supply to the plunger 37 is cut off by that signal, and the lens positioning plate 34 moves upwardly so that the bar 26' fits in one of the grooves 341, 342 and 343 which corresponds to the selected magnification while at the same time, the motor 33 is deenergized, whereby the lens assembly is stopped. At this time, the focal length of the lens system is changed by a mechanism to be described so as to correspond to the selected magnification. After termination of such magnification changing operation, the original carriage starts to move forward as previously described and the photosensitive member is slit-exposed to the image of the original as previously described.

Now, referring to FIGS. 2, 3 and 5, wire 39 is passed over pulleys 40, 41 and 42 rotatably disposed at predetermined positions. The pulley 40, like the pulley 30, is connected to the output shaft of the motor 33 and the pulleys 30 and 40 are rotated together with each other by rotation of the motor 33. In the present embodiment, the diameter of the pulley 40 is smaller than the diameter of the pulley 30 and accordingly, the peripheral velocity of the pulley 40 is lower than the peripheral velocity of the pulley 30. In other words, the movement velocity of the wire 39 is small relative to the movement velocity of the wire 29 (which is equal to the movement velocity of the carriage 26). A gear train may be interposed between the pulley 30 and the pulley 40, whereby the peripheral velocities of the pulleys 30 and 40 may be made different from each other. In this case, the pulleys 30 and 40 may be of the same diameter or different diameters.

The wire 39 is changed in direction by a guide pulley 43 rotatably supported on a shaft 43' fixed to the carriage 26, whereafter it is wound on the outer lens barrel 15 and then changed in direction by a guide pulley 44 rotatably supported on a shaft 44' fixed to the carriage 26, whereafter it is passed over a pulley 42. The wire 39 is wound in a groove 15' formed in the outer lens barrel 15 so that the wire 39 does not move relative to the outer lens barrel 15 in the direction of the optical axis of the lens and during said movement of the lens assembly, the engaging portions of the wire 39 and the outer lens barrel 15 do not deviate from each other on the outer lens barrel. In order to positively prevent the deviation of the wire on the outer lens barrel in the direction of the optical axis and prevent the wire from slipping relative to the outer lens barrel in the wire driving direction, the wire 39 is secured to the outer lens barrel 15 by a wire keeping member 45 fixed to the outer lens barrel 15 by means of a screw 46.

When the ratio of the diameter of the pulley 30 to the diameter of the pulley 40 is 1:C, the ratio of the peripheral speed of the pulley 30 to the peripheral speed of the pulley 40 is 1:C and therefore, when the motor 30 is rotated to move the wire 29 (and accordingly the carriage 26) by a distance S, the wire 39 is moved by a distance $\alpha S$. That is, the speed of the wire 39 is the speed of the carriage 26, or in other words, the speed of the zoom lens assembly 13 as a whole, multiplied by a constant C. Thus, the outer lens barrel 15 fixed to the wire 39 is rotated by the difference in amount of movement between the carriage 26 and the wire 39, i.e., $(1-C)S$. By setting the constant C to a value approximate to 1, the amount of rotation of the outer lens barrel 15 can be made small as compared with the amount of movement of the zoom lens assembly 13 as a whole. As will be seen from the foregoing, the amount of rotation of the outer lens barrel 15 corresponds to the amount of movement of the carriage 26 to which the lens assembly 13 is attached, and on the other hand, the amount of rotation of the outer lens barrel 15 corresponds to the amount of change of the focal length. Accordingly, the shape of the slot cam 24 is set so that when the lens assembly 13 is moved by a necessary distance in changing the copying magnification, the focal length is also changed by an amount necessary for the magnification change. Although, in the present embodiment, the constant C is smaller than 1, the constant C is selected to a value greater than 1 in case the direction of inclination of the slot cam 24 is made reverse to that shown in FIG. 4.

In any case, in the above-described example, the operation of the focal length changing assembly portion which only requires a samll amount of operation as compared with the necessary amount of movement of the lens assembly as a whole during magnification change can be achieved by suitably setting the speed ratio between the carriage 26 and the wire 39 for driving the focal length changing assembly portion, and this leads to compactness of the apparatus as well as improved reliability of the apparatus.

In the previously described example, the pulley 30 for driving the carriage 26 and the pulley 40 for driving the outer lens barrel 15 (and accordingly the inner lens barrel 17) are driven by the same motor 33. This is preferable in that synchronization of the drivers of the two pulleys 30 and 40 can be simply accomplished and the operational error can be minimized, but design may also be made such that the pulleys 30 and 40 are driven by discrete motors.

Although the previously described example is designed such that the carriage 26 is moved by a pulley-wire mechanism, other mechanism may be adopted as the mechanism for moving the carriage 26. For example a rack may be fixed to the carriage 26, and a pinion in mesh engagement therewith may be provided and driven by a motor, thereby moving the carriage 26. Again in that case, the wire 39 for driving the focal length changing movable assembly portion is driven in synchronism with the carriage 26 and the speed of the wire 39 is made different from the speed of the carriage 26 (namely, the speed of the lens assembly as a whole).

Also, in the previously described embodiment, the cam 24 is provided on the lens barrel 16 fixed to the carriage 26. However, a cam follower 23 may be provided on the lens barrel 16 fixed to the carriage 26, a cam may be provided on the lens barrel 17 moved relative to the lens barrel 16 and this cam may be engaged with the cam follower. In this case, a pin or the like for slidably engaging the slot 25 in the outer lens barrel 15 is studded on the lens barrel 17 provided with the cam to receive the rotational force of the outer lens barrel 15.

Although, in the previously described embodiment, the inner lens barrel is rotatively driven by the outer lens barrel, the wire 39 may be directly wound on the inner lens barrel so that the inner lens barrel may be rotated without the use of the outer lens barrel.

Further, in the previously described embodiment, the intermediate lens barrel 16 is fixed to the carriage 26, but instead, the inner lens barrel 17 may be fixed to the carriage 26 so that the intermediate lens barrel 16 may be moved relative to the inner lens barrel 17.

Each lens barrel need not be of a cylindrical shape having a full circumference but may be of a shape having only a part of the full circumference of a cylinder. In short, the lens barrel 15 should only be rotatable relative to the lens barrel 16 about the optical axis X and the lens barrel 17 should only be rotatable relative to the lens barrel 16 about the optical axis X.

Belt, string or other flexible power transmitting member may be used instead of the wires 29, 39 and in the present spacification, "wire member" is a general term for these.

While, in the previously described embodiment, the original carriage is moved to scan the original, the present invention is also applicable to an apparatus in which an original is conveyed through an illuminating portion by a so-called original feeding device, whereby the original is scanned, an apparatus in which the mirrors disposed in the optical path between the original and the lens are moved to scan the original, or an apparatus designed such that the photosensitive member is exposed to the image of the whole surface of the original at a time.

The present invention is also applicable to an original reading apparatus such as a copying apparatus or a facsimile apparatus in which an image pickup element such as a charge coupled device (CCD) is used as the photosensitive member and original optical image information is once converted into an electrical signal, whereby various images are formed on the basis of this electrical signal.

While the previously described embodiment is designed such that three stages of magnification change can be accomplished, the present invention is also applicable to an apparatus in which more than three stages of magnification change or two stages of magnification change are effected, or an apparatus in which magnification change can be effected continuously without any stage.

What we claim is:

1. A variable magnification image formation apparatus including:
   means for supporting an original;
   a photosensitive member;
   a zoom lens assembly disposed in an optical path between said means for supporting an original and said photosensitive member for forming an image of the original on said photosensitive member, said zoom lens assembly having a rotational member rotatable about the optical axis of the lens to change the focal length of the zoom lens, and the length of said optical path being constant irrespective of selected magnification;

zoom lens assembly moving means for moving said zoom lens assembly along a predetermined path to change the magnification of the image of the original;

a wire member wound onto said rotational member; and wire member moving means for moving said wire member at the movement speed of said zoom lens assembly multiplied by a predetermined constant different from 1 in synchronism with the operation of said zoom lens assembly moving means to rotate said rotational member.

2. An apparatus according to claim 1, wherein said zoom lens assembly moving means and said wire member moving means have a common drive source.

3. An apparatus according to claim 2, wherein said zoom lens assembly moving means has a wire member mechanically connected to said zoom lens assembly, and a first drive pulley with which said wire member mechanically connected to said zoom lens assembly is engaged and which is rotatively driven by said drive source, and said wire member moving means has a second drive pulley with which said wire member wound on to said rotational member is engaged and which is rotatively driven by said drive source, said second drive pulley differing in diameter from said first drive pulley.

4. A variable magnification image formation apparatus including:

means for supporting an original;
a photosensitive member;
a zoom lens assembly disposed in an optical path between said original supporting means and said photosensitive member for forming an image of the original on said photosensitive member, said zoom lens assembly having at least first and second lenses disposed along the optical axis of the lens, and a rotational member rotatable about the optical axis of the lens to move said second lens relative to said first lens along the optical axis of the lens, and the length of said optical path being constant irrespective of selected magnification;
a movable carriage supporting said zoom lens assembly thereon;
carriage moving means for moving said movable carriage along a predetermined path having at least the direction of the optical axis of the lens as a direction component to change the magnification of the image of the original;
a wire member wound on to said rotational member; and
wire member moving means for moving said wire member in response to the operation of said carriage moving means to rotate said rotational member about the optical axis of the lens, said wire member moving means moving said wire member at a speed of $C \times V$, where C is a predetermined constant and V is the speed of the carriage.

5. An apparatus according to claim 4, wherein said wire member is engaged with said rotational member so that during movement of the carriage, it is not moved relative to the rotational member in the direction of the optical axis of the lens.

6. An apparatus according to claim 5, wherein said wire member moving means has wire direction changing means disposed on said carriage for changing the direction of said wire member at positions before and behind the portion engaged with said rotational member, and wire member supporting means for supporting said wire member in parallelism to the movement path of the carriage between itself and said direction changing means.

7. An apparatus according to claim 6, wherein said carriage moving means has a wire member engaged with the carriage and extended in parallelism to the movement path of the carriage before and behind the portion engaged with the carriage, and a first drive pulley for driving said wire member engaged with the carriage said wire member moving means is provided with a second drive pulley for driving the wire member engaged with said rotational member, and said first and second drive pulleys are driven by the same drive source.

8. An apparatus according to any of claims 6 to 7, wherein said constant C differs from 1.

9. A variable magnification image formation apparatus including:

means for supporting an original;
a photosensitive member;
an optical path between said original supporting means and said photosensitive member, said optical path having a constant length irrespective of selected magnification;
a zoom lens assembly disposed in said optical path for forming an image of the original on said photosensitive member at a selected magnification, said zoom lens assembly having a first lens barrel portion having a cam, and a second lens barrel portion engaged with said cam and rotatable relative to said first lens barrel portion about the optical axis of the lens and movable relative to said first lens barrel portion in the direction of the optical axis of the lens, said cam having a shape for moving said second lens barrel portion relative to said first lens barrel portion in the direction of the optical axis of the lens to change the zoom lens focal length when said second lens barrel portion is rotated relative to said first lens barrel portion about the optical axis of the lens;
a movable carriage supporting said zoom lens assembly thereon;
carriage moving means for moving said carriage to a position corresponding to the selected magnification along a predetermined path having at least the direction of the optical axis of the lens as a direction component;
a wire member wound on to said zoom lens assembly for rotating said first and second lens barrel portions relative to each other about the optical axis of the lens; and
wire member moving means for moving said wire member by an amount corresponding to the selected magnification in synchronism with the movement of said carriage, said wire member moving means moving said wire member at the speed of said carriage multiplied by a predetermined constant.

10. An apparatus according to claim 9, wherein said first lens barrel portion is mounted on said carriage so that it does not move relative to said carriage in the direction of the optical axis of the lens.

11. An apparatus according to claim 10, wherein said zoom lens assembly has a third lens barrel portion rotatable about the optical axis of the lens at a predetermined position on said carriage and operatively connected to said second lens barrel portion, and said wire member is wound on to said third lens barrel portion so that during movement of said carriage, it does not move relative to said third lens barrel portion in the direction of the optical axis of the lens.

12. An apparatus according to claim 9, wherein said second lens barrel portion is mounted on said carriage so that it does not move relative to said carriage in the direction of the optical axis of the lens.

13. An apparatus according to claim 12, wherein said zoom lens assembly has a third lens barrel portion rotatable about the optical axis of the lens at a predetermined position on said carriage and operatively connected to said first lens barrel portion, and said wire member is wound onto said third lens barrel portion so that during movement of said carriage, it does not move relative to said third lens barrel portion in the direction of the optical axis of the lens.

14. An apparatus according to any of claims 9 to 13, wherein said zoom lens assembly has at least first and second lens elements arranged on the optical axis of the lens, said first lens element being fixed relative to said first lens barrel portion and said second lens element being fixed relative to said second lens barrel portion.

15. An apparatus according to claim 14, wherein said constant differs from 1.

16. An apparatus according to claim 15, wherein said wire member moving means has wire direction changing means disposed on said carriage for changing the direction of said wire member at positions before and behind the portion engaged with said zoom lens assembly, and wire member supporting means for supporting said wire member in parallelism to the movement path of the carriage between it and said direction changing means.

17. An apparatus according to claim 16, wherein said carriage moving means has a wire member engaged with the carriage and extended in parallelism to the movement path of the carriage before and behind the portion engaged with the carriage, and a first drive pulley for driving said wire member, said wire member engaged with the carriage moving means is provided with a second drive pulley for driving the wire member engaged with said zoom lens assembly, and said first and second drive pulleys are driven by the same drive source.

18. A variable magnification image formation apparatus in which at least first and second image formation magnifications can be selected, including:
means for supporting an original;
a photosensitive member;
an optical path between said original supporting means and said photosensitive member, said optical path having a constant length irrespective of selected magnification;
a zoom lens assembly disposed in said optical path for forming an image of the original on said photosensitive member at a selected magnification, said zoom lens assembly having a first lens barrel portion having a cam for changing the focal length correspondingly to the selected magnification, a second lens barrel portion engaged with said cam and rotatable relative to said first lens barrel portion about the optical axis of the lens and movable relative to said first lens barrel portion in the direction of the optical axis of the lens, a first area of said cam corresponding to a first magnification and a second area of said cam corresponding to a second magnification being perpendicular to the optical axis of the lens, a third area connecting said first area and said second area being inclined relative to the optical axis of the lens;
a movable carriage supporting said zoom lens assembly thereon;
carriage moving means for moving said carriage to a position corresponding to the selected magnification along a predetermined path having at least the direction of the optical axis of the lens as a direction component;
a wire member wound on to said zoom lens assembly for rotating said first and second lens barrel portions relative to each other about the optical axis of the lens; and
wire member moving means for moving said wire member by an amount corresponding to the selected magnification in synchronism with the movement of said carriage, said wire member moving means moving said wire member at the speed of said carriage multiplied by a predetermined constant.

19. An apparatus according to claim 18, wherein said first lens barrel is mounted on said carriage so that it does not move relative to said carriage in the direction of the optical axis of the lens.

20. An apparatus according to claim 19, wherein said zoom lens assembly has a third lens barrel portion rotatable about the optical axis of the lens at a predetermined position on said carriage and operatively connected to said second lens barrel portion, and said wire member is wound onto said third lens barrel portion so that during movement of said carriage, it does not move relative to said third lens barrel portion in the direction of the optical axis of the lens.

21. An apparatus according to claim 18, wherein said second lens barrel portion is mounted on said carriage so that it does not move relative to said carriage in the direction of the optical axis of the lens.

22. An apparatus according to claim 21, wherein said zoom lens assembly has a third lens barrel portion rotatable about the optical axis of the lens at a predetermined position on said carriage and operatively connected to said first lens barrel portion, and said wire member is wound onto said third lens barrel portion so that during movement of said carriage, it does not move relative to said third lens barrel portion in the direction of the optical axis of the lens.

23. An apparatus according to any of claims 18 to 22, further including zoom lens assembly portion detecting means forming a signal when said zoom lens assembly has come to a position corresponding to the first magnification and when said zoom lens assembly has come to a position corresponding to the second magnification and wherein said carriage moving means and said wire member moving means stop their operation in response to said signal.

24. An apparatus according to claim 23, wherein said constant differs from 1.

25. An apparatus according to claim 24, wherein said wire member moving means has wire direction changing means disposed on said carriage for changing the direction of said wire member at positions before and behind the portion engaged with said zoom lens assembly, and wire member supporting means for supporting said wire member in parallelism to the movement path of the carriage between itself and said direction changing means.

26. An apparatus according to claim 25, wherein said carriage moving means has a wire member engaged with the carriage and extended in parallelism to the movement path of the carriage before and behind the portion engaged with the carriage, and a first drive pulley for driving said wire member engaged with the carriage, said wire member moving means is provided with a second drive pulley for driving the wire member engaged with said zoom lens assembly, and said first and second drive pulleys are driven by the same drive source.

* * * * *